(12) United States Patent
Furukawa

(10) Patent No.: US 7,495,701 B2
(45) Date of Patent: Feb. 24, 2009

(54) IMAGING SYSTEM CAPABLE OF SETTING SENSITIVITY

(75) Inventor: Nobuyuki Furukawa, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 11/103,085

(22) Filed: Apr. 11, 2005

(65) Prior Publication Data

US 2005/0231622 A1    Oct. 20, 2005

(30) Foreign Application Priority Data

Apr. 16, 2004    (JP) ............................. 2004-122079

(51) Int. Cl.
*H04N 5/225* (2006.01)

(52) U.S. Cl. ................. 348/308; 348/300; 348/302; 348/310; 250/208.1

(58) Field of Classification Search ............... 348/308, 348/208.1
See application file for complete search history.

(56) References Cited

U.S. PATENT DOCUMENTS

2004/0189846 A1*  9/2004  Hiyama et al. .............. 348/308

FOREIGN PATENT DOCUMENTS

| JP | 11-261046 A | 9/1999 |
| JP | 2003-197890 A | 7/2003 |

* cited by examiner

*Primary Examiner*—Ngoc-Yen T Vu
*Assistant Examiner*—Joel Fosselman
(74) *Attorney, Agent, or Firm*—Canon USA, Inc., IP Division

(57) ABSTRACT

An imaging system includes a plurality of pixels and a control circuit. Each pixel includes a photoelectric transducer converting an optical signal into signal charge, a charge transfer device transferring the signal charge converted by the photoelectric transducer, an amplifying device amplifying the signal charge transferred from the photoelectric transducer by the charge transfer device and outputting the amplified signal charge to an output line, and a reset switch used for resetting the voltage of an input terminal of the amplifying device. The control circuit switches a reset voltage supplied through the reset switch in accordance with a sensitivity set in the imaging system.

1 Claim, 12 Drawing Sheets

--Prior Art--

--Prior Art--

IMAGING SYSTEM CAPABLE OF SETTING SENSITIVITY

BACKGROUND OF THE INVENTION

1. Field of the Invention

The present invention relates to an imaging system for capturing an image of an object.

2. Description of the Related Art

Image pickup devices, in which photoelectric transducers are arranged one-dimensionally or two-dimensionally, include charge coupled devices (CCDs) and amplified MOS type image pickup devices. The amplified MOS type image pickup devices have the advantage of easy mounting in peripheral circuits and driving at low voltage. Accordingly, it is anticipated that the amplified MOS type image pickup devices will be utilized in the field of portable information devices.

FIG. 9 shows a schematic structure of an amplified MOS type image pickup device and the readout circuit of the amplified MOS type image pickup device.

Referring to FIG. 9, the amplified MOS type image pickup device includes pixels 100, vertical signal lines 107 (107a to 107e), and horizontal scanning lines 902 (902a to 902e). The pixels 100 will be described in detail below with reference to FIG. 10. The vertical signal lines 107 are used for transmitting outputs from the pixels 100 to a memory 909 for temporarily storing pixel outputs (signal storage). The horizontal scanning lines 902 are used for transmitting signals from a vertical scanning circuit (VSR) 914 to the pixels 100 in the N-th line (N denotes a natural number).

The structure in FIG. 9 includes switch metal oxide silicon (MOS) transistors 903 (903a to 903e), an output amplifier 904, the vertical scanning circuit 914, the memory 909 for temporarily storing pixel outputs, a horizontal scanning circuit (HSR) 910, and a gain controller 913. The switch MOS transistors 903 sequentially transfer the signals from the memory 909 to the output amplifier 904. The vertical scanning circuit 914 selects the pixels 100 (pixel lines) that output signal charge to the corresponding vertical signal line 107. The memory 909 temporarily stores the outputs from the pixels 100 in the N-th line. The horizontal scanning circuit (HSR) 910 sequentially outputs the outputs from the pixels 100 stored in the memory 909. The gain controller 913 controls the gain of the output amplifier 904.

FIG. 10 illustrates an equivalent circuit of a pixel 100 in the amplified MOS type image pickup device.

Referring to FIG. 10, the equivalent circuit includes a photodiode 101, a reset MOS transistor 102, a transfer MOS transistor 103, a source follower amplifier (amplification MOS transistor) 104, a line-selection MOS transistor 105, a floating diffusion region (hereinafter referred to as a FD region) 106, and the vertical signal line 107. The photodiode 101 converts an optical signal into signal charge (photoelectric conversion). The reset MOS transistor 102 resets the photodiode 101 and the FD region 106. The transfer MOS transistor 103 reads out the signal charge subjected to the photoelectric conversion in the photodiode 101. The source follower amplifier 104 performs voltage conversion for the readout signal charge and is connected to the FD region 106. The line-selection MOS transistor 105 supplies the output from the source follower amplifier 104 to the vertical signal line 107. Control signals φpres, φptx, and φpsel are applied to the gate electrodes of the reset MOS transistor 102, the transfer MOS transistor 103, and the line-selection MOS transistor 105, respectively.

The operation of the amplified MOS type image pickup device shown in FIG. 10 will now be described.

First, the reset MOS transistor 102 and the transfer MOS transistor 103 are turned on and the transfer MOS transistor 103 is then turned off to reset the photodiode 101. The photodiode 101 enters a storage state.

Next, turning off the reset MOS transistor 102 completes the resetting of the FD region 106. Turning on the line-selection MOS transistor 105 after a storage time "ts" elapsed activates the source follower amplifier 104 to turn on the transfer MOS transistor 103 in order to read out the signal charge subjected to the photoelectric conversion in the photodiode 101.

An efficient transfer method and a method of extending a dynamic range when the signal charge is transferred from the photodiode 101 to the vertical signal line 107 are disclosed in detail in Japanese Patent Laid-Open No. 11-261046 and Japanese Patent Laid-Open No. 2003-197890. In Japanese Patent Laid-Open No. 11-261046, for example, a technique for applying a voltage different from the power voltage to the gates of the reset MOS transistor 102 and the transfer MOS transistor 103 is disclosed. In Japanese Patent Laid-Open No. 2003-197890, for example, a technique for setting the threshold of the reset MOS transistor 102 for resetting the FD region 106 to a value smaller than the threshold of the source follower amplifier 104 is disclosed.

Owing to these techniques, the image qualities of digital cameras have been remarkably improved and are in the process of exceeding the image qualities of known silver films. Since detailed descriptions of such techniques are disclosed in the above patent documents, they are omitted herein.

Through the use of these techniques, it becomes possible to realize a digital camera that can extend the dynamic range and that can be accommodated to any sensitivity from International Organization for Standardization (ISO) 200, in terms of the sensitivity of a silver film, to ISO 1600 with one sensor by switching the gain of the output amplifier 904 after the photodiode 101 outputs the signal charge to the vertical signal line 107.

However, digital cameras that can capture images at low sensitivity, that is, at ISO 100, ISO 50, or ISO 025 in terms of the sensitivity of a silver film, have not been realized. This is because an increase in the signal to noise (S/N) ratio of image signals is desirable in a region having low ISO sensitivity.

In order to improve the S/N ratio of the image signals, it is necessary to sufficiently increase the amount of signal charge against the signals that cause noises. With this view, the photodiode 101 in one pixel is desirably designed so as to increase the area thereof. Accordingly, the areas of known photodiodes were increased and the widened photodiodes are used to produce sensors. In this case, there is a problem in that a large amount of signal charge subjected to the photoelectric conversion in the photodiode becomes saturated in the FD region 106.

Applying the technique disclosed in Japanese Patent Laid-Open No. 2003-197890 to increase a voltage from the power supply VDD, for resetting the FD region 106, (a reset voltage), results in a larger amount of signal charge, compared with known cases.

However, in the digital cameras having the increased reset voltage in the manner described above, there is a problem in that image capturing at high sensitivity causes so-called black crushing, in which the pixels close to black in the image of an object in a dark condition are roughly represented. It is presumed here that the voltage from the power supply VDD (reset voltage) is switched from 4.1V to 5V.

FIG. 11 is a log-log graph showing the relationship (photoelectric conversion characteristic) between the amount of light received by the photodiode 101 and the level of a signal output from the photodiode 101 to the vertical signal line 107.

Referring to FIG. 11, for example, when the ISO sensitivity is ISO 100, photoelectric conversion characteristic 1100, between the amount of light received by the photodiode 101 and the level of a signal received by the memory 909 through the corresponding vertical signal line 107, has a maximum value A1 of the amount of light and a maximum value S1 of the level of the signal. The signal received by the memory 909 in this manner is amplified by the output amplifier 904 shown in FIG. 9 and is converted into a digital signal of 10 bits or two bits by an analog-to-digital (A/D) converter (not shown).

When the ISO sensitivity is ISO 400, the amount of light received by the photodiode 101 is A2, which is one fourth of the amount of light received by the photodiode 101 at ISO 100. In addition, the memory 909 receives a signal at a signal level S2 corresponding to the amount of received light A2. The received signal is amplified fourfold by the output amplifier 904 and is converted into a digital signal of 10 bits or 12 bits by the A/D converter (not shown).

The black crushing referenced above will now be described with reference to FIG. 12.

FIG. 12 is a graph illustrating the enlarged photoelectric conversion characteristic of the photodiode 101 in a region, in FIG. 11, where both the amount of light received by the photodiode 101 and the level of a signal output from the photodiode 101 to the vertical signal line 107 are close to zero.

As seen from the photoelectric conversion characteristic 1100 shown in FIG. 12, the linearity of the relationship between the amount of received light and the signal level is reduced along with a decrease in the amount of received light (signal level). Although the relationship between the amount of light received by the photodiode 101 and the level of the signal output from the photodiode 101 are represented in the log-log graph in FIG. 12, a linear graph representing the relationship shows that the signal of the level corresponding to the amount of the signal charge is not transferred to the vertical signal line 107.

Such a phenomenon does not occur when the voltage from the power supply VDD (reset voltage) is set to 4.1V, but occurs when the voltage from the power supply VDD (reset voltage) is increased to 5V.

As described above, in related arts, it is difficult to properly perform the image capturing depending on the sensitivity of the photoelectric transducer and, furthermore, the image capturing cannot be properly performed when the sensitivity of the photoelectric transducer is too low or too high.

SUMMARY OF THE INVENTION

The present invention provides an imaging system capable of properly capturing an image regardless of the sensitivity set in the imaging system.

The present invention provides, according to an embodiment, an imaging system including a plurality of pixels and a control circuit. Each pixel includes a photoelectric transducer converting an optical signal into signal charge, a charge transfer device transferring the signal charge converted by the photoelectric transducer, an amplifying device amplifying the signal charge transferred from the photoelectric transducer by the charge transfer device and outputting the amplified signal charge to an output line, and a reset switch used for resetting the voltage of an input terminal of the amplifying device. The control circuit switches a reset voltage supplied through the reset switch in accordance with a sensitivity set in the imaging system.

The present invention provides, according to another embodiment, a method of controlling an imaging system including a plurality of pixels, each pixel including a photoelectric transducer converting an optical signal into signal charge, a charge transfer device transferring the signal charge converted by the photoelectric transducer, an amplifying device amplifying the signal charge transferred from the photoelectric transducer by the charge transfer device and outputting the amplified signal charge to an output line, and a reset switch used for resetting the voltage of an input terminal of the amplifying device. A reset voltage supplied through the reset switch is switched in accordance with a sensitivity set in the imaging system.

Further features and advantages of the present invention will become apparent from the following description of exemplary embodiments with reference to the attached drawings.

DESCRIPTION OF THE EMBODIMENTS

First Embodiment

A first embodiment of the present invention will be described below with reference to the attached drawings.

Figure 2:
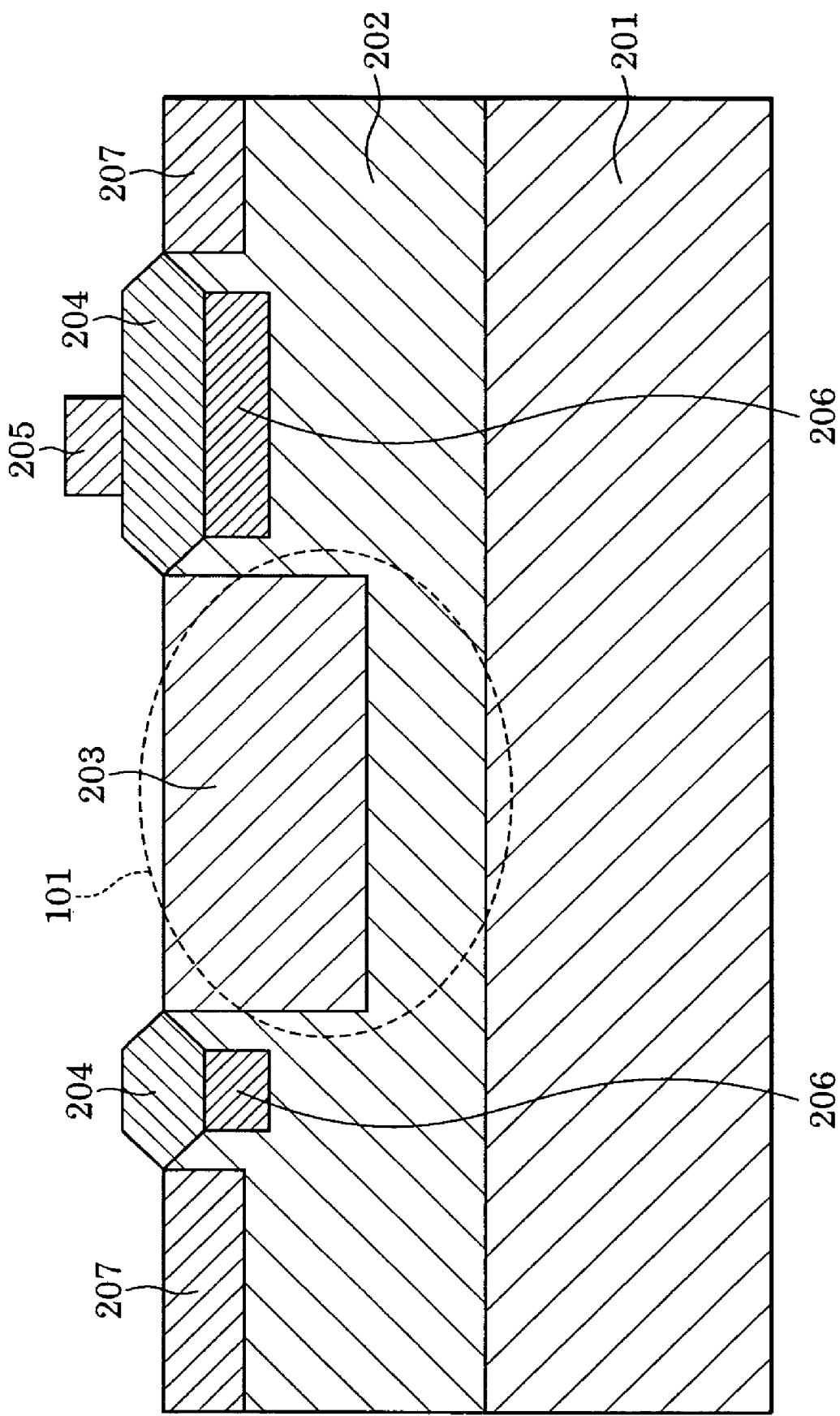
FIG. 2 is a cross-sectional view showing an example of the structure of a photodiode in a unit cell of the amplified MOS type image pickup device according to the first embodiment of the present invention.

FIG. 2 is a cross-sectional view showing an example of the structure of a photodiode in a unit cell of an amplified MOS type image pickup device according to the first embodiment of the present invention.

Referring to FIG. 2, an n-type semiconductor layer 203 and a p-type semiconductor layer 202 on an n-type semiconductor substrate 201 form a photodiode 101. The n-type semiconductor layer 203, which is self-aligned with a selective oxidation film 204 for separating the elements, is formed so as to reach the limit of the area thereof. The area of the n-type semiconductor layer 203 corresponds to the area of the photodiode 101.

Source-drain regions 207 of MOS transistors adjacent to the photodiode 101 and channel stop layers 206 for increasing the punch-through voltage against the n-type semiconductor layer 203 of the photodiode 101 are formed under the selective oxidation film 204 for separating the elements. A wiring layer 205 is formed over the selective oxidation film 204.

Figure 1:
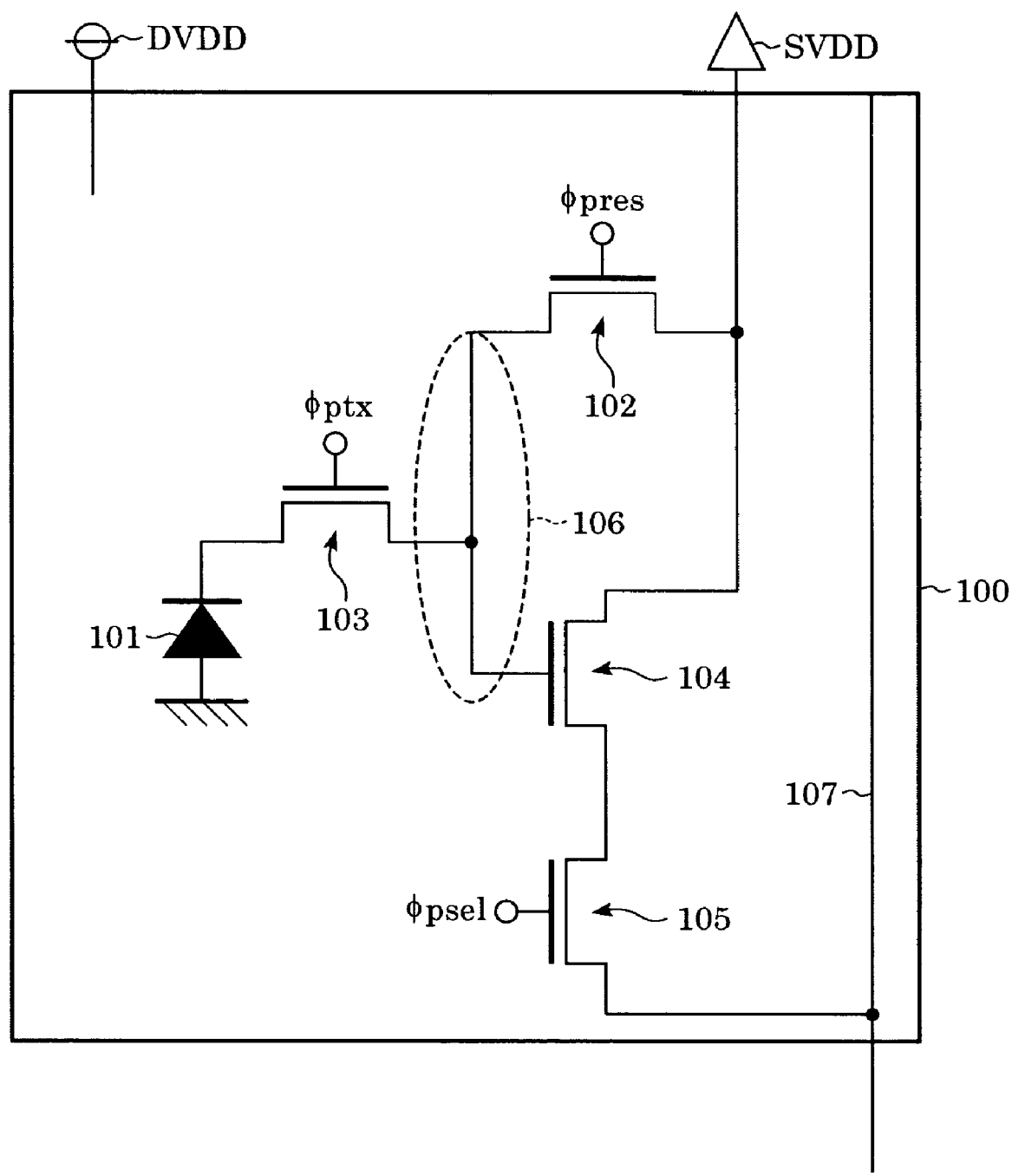
FIG. 1 illustrates an example of an equivalent circuit of an amplified MOS type image pickup device according to a first embodiment of the present invention.

FIG. 1 illustrates an equivalent circuit of the amplified MOS type image pickup device according to the first embodiment. The same reference numerals are used in FIG. 1 to identify the elements having the same functions as in FIG. 10. A detailed description of such elements is therefore omitted herein.

Figure 10:
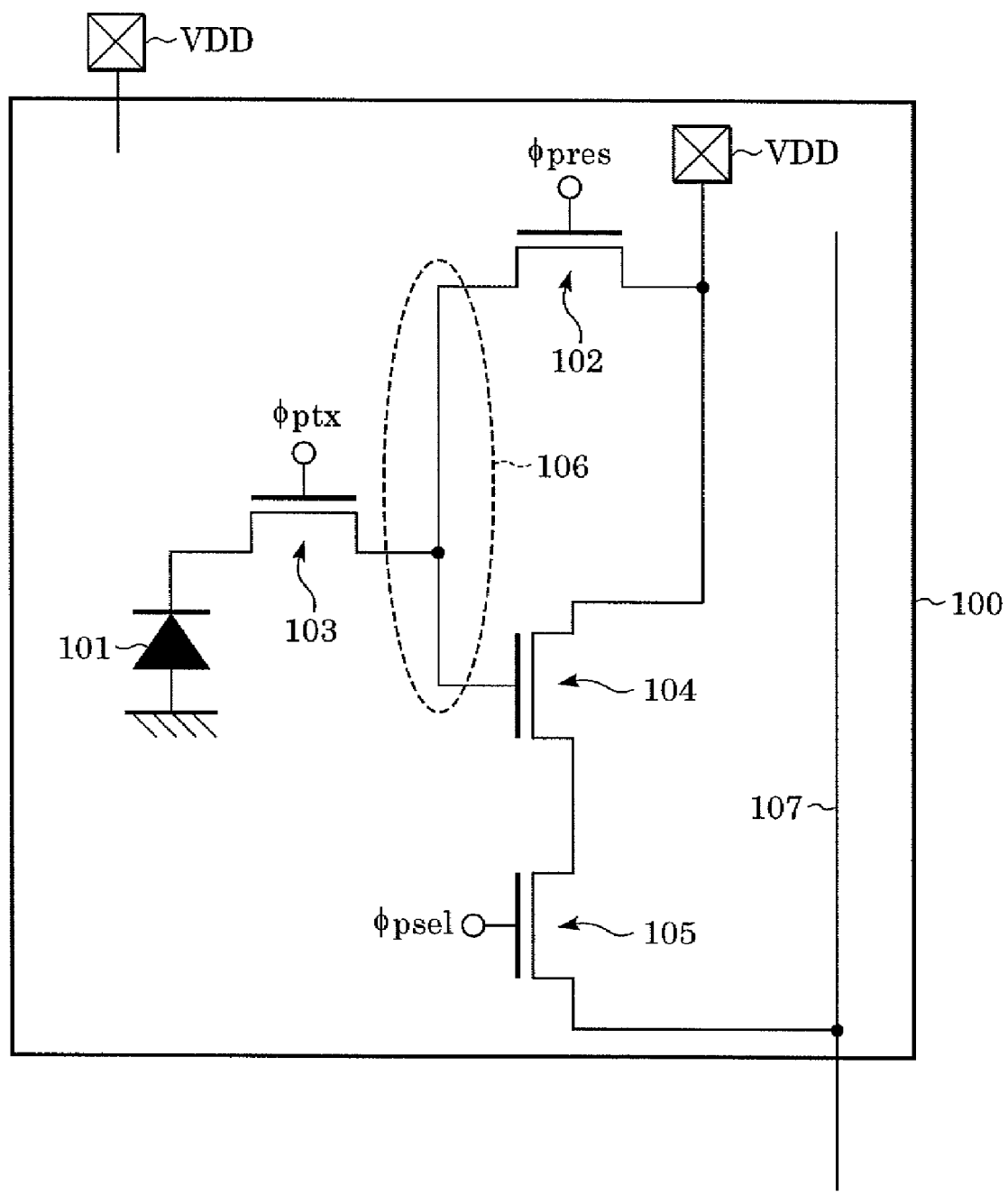
FIG. 10 illustrates an equivalent circuit of a pixel in an amplified MOS type image pickup device in a related art.
Figure 11:
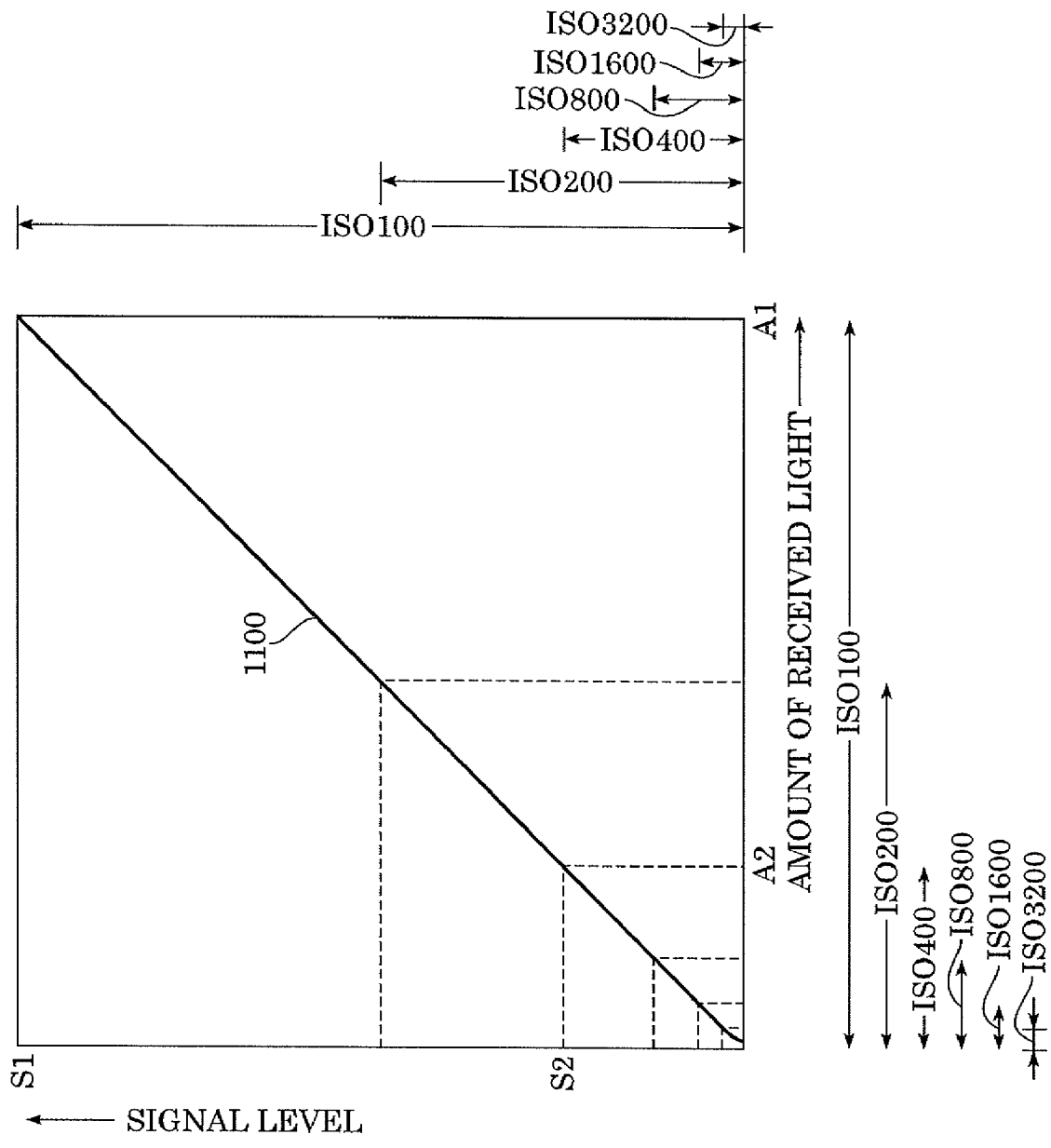
FIG. 11 is a log-log graph showing a photoelectric conversion characteristic of a photodiode in a related art.
Figure 12:
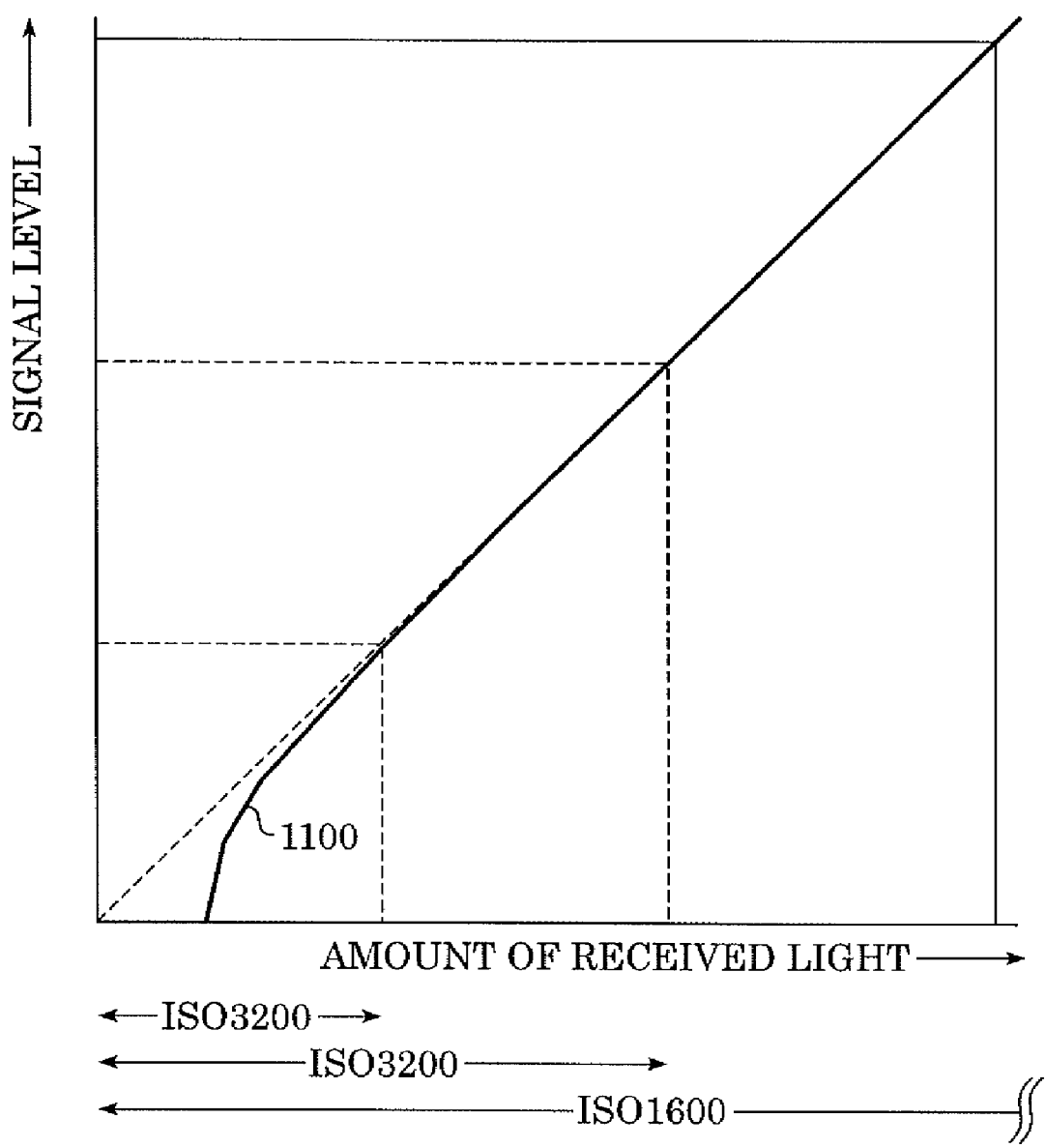
FIG. 12 is a graph illustrating an enlarged photoelectric conversion characteristic of a photodiode in a region where both the amount of light received by the photodiode and the level of a signal output from the photodiode to a vertical signal line are close to zero in a related art.

Referring to FIG. 1, the amplified MOS type image pickup device according to the first embodiment differs from the amplified MOS type image pickup device in FIG. 10 in that the power supply for a reset MOS transistor 102 and a source follower amplifier 104 is not the power supply VDD but a power supply SVDD. Specifically, according to the first embodiment, a reset voltage used for resetting a floating diffusion region 106 (the voltage of the gate electrode of the source follower amplifier 104) is supplied from the power supply SVDD.

Figure 3:
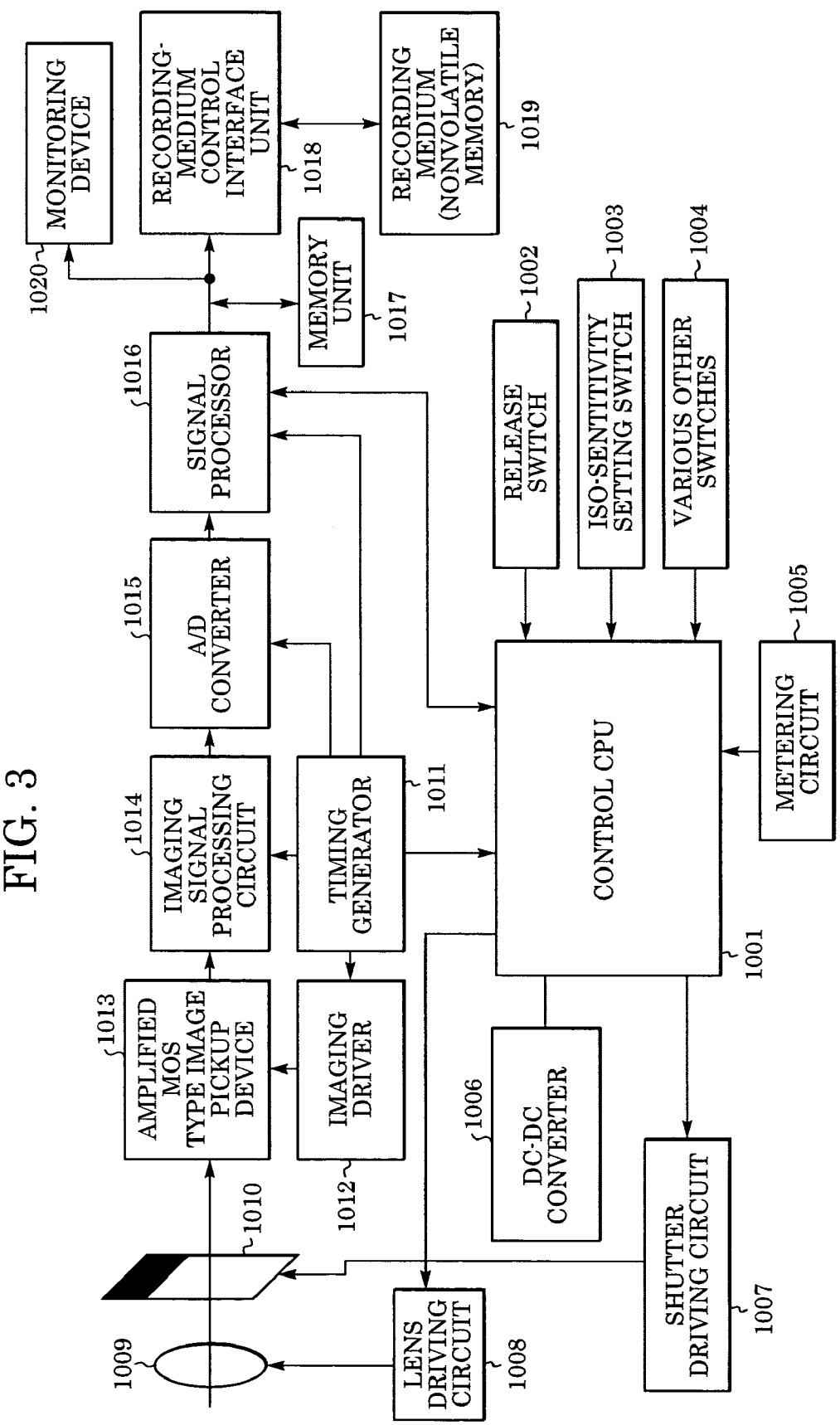
FIG. 3 is a block diagram showing an example of the structure of a digital camera according to the first embodiment of the present invention.

FIG. 3 is a block diagram showing an example of the structure of a digital camera according to the first embodiment.

Referring to FIG. 3, the digital camera includes a control central processing unit (CPU) 1001, a release switch 1002, an ISO-sensitivity setting switch 1003, and various other switches 1004. The control CPU 1001 controls the entire digital camera. The ISO-sensitivity setting switch 1003 sets the sensitivity of a sensor. A user operates the ISO-sensitivity setting switch 1003 to set the sensitivity of the sensor, corresponding to the ISO sensitivity of a silver film. The various other switches 1004 include switches used for setting the f-number, shutter speed, and illumination.

The digital camera also includes a metering circuit 1005, a direct current-to-direct current (DC-DC) converter 1006, a shutter driving circuit 1007, a lens driving circuit 1008, a lens 1009, and a shutter 1010. The DC-DC converter 1006 supplies various voltages required in the digital camera. The shutter driving circuit 1007 drives the shutter 1010 in response to a signal supplied from the control CPU 1001. The lens driving circuit 1008 drives the lens 1009 in response to a signal supplied from the control CPU 1001.

The digital camera further includes a timing generator 1011, an imaging driver 1012, an amplified MOS type image pickup device 1013, an imaging signal processing circuit 1014, an analog-to-digital (A/D) converter 1015, and a signal processor 1016. The timing generator 1011 supplies various timing signals to the imaging driver 1012, the imaging signal processing circuit 1014, and the A/D converter 1015. The imaging driver 1012, the imaging signal processing circuit 1014, and the A/D converter 1015 operate in accordance with the timing signals. The amplified MOS type image pickup device 1013 includes the circuit described above with reference to FIG. 1. The imaging driver 1012 drives the amplified MOS type image pickup device 1013.

The imaging signal processing circuit 1014 performs a variety of processing, such as correction or clamping, for an image signal output from the amplified MOS type image pickup device 1013. The A/D converter 1015 performs analog-to digital conversion for the image signal supplied through the imaging signal processing circuit 1014. The signal processor 1016 performs a variety of correction and/or data compression for the image data supplied from the A/D converter 1015.

The digital camera further includes a memory unit 1017, a recording-medium control interface unit 1018, a removable recording medium 1019, and a monitoring device 1020. The memory unit 1017 temporarily stores the image data. The image data is recorded in the recording medium 1019, such as a nonvolatile semiconductor memory. The recording-medium control interface unit 1018 is used for recording the image data in the recording medium 1019 and for reading out the image data from the recording medium 1019. The monitoring device 1020, such as a thin film transistor (TFT) liquid crystal display, displays a captured image and menu screens. The user performs various settings or confirms the captured image based on the content displayed on the monitoring device 1020.

Figure 4:
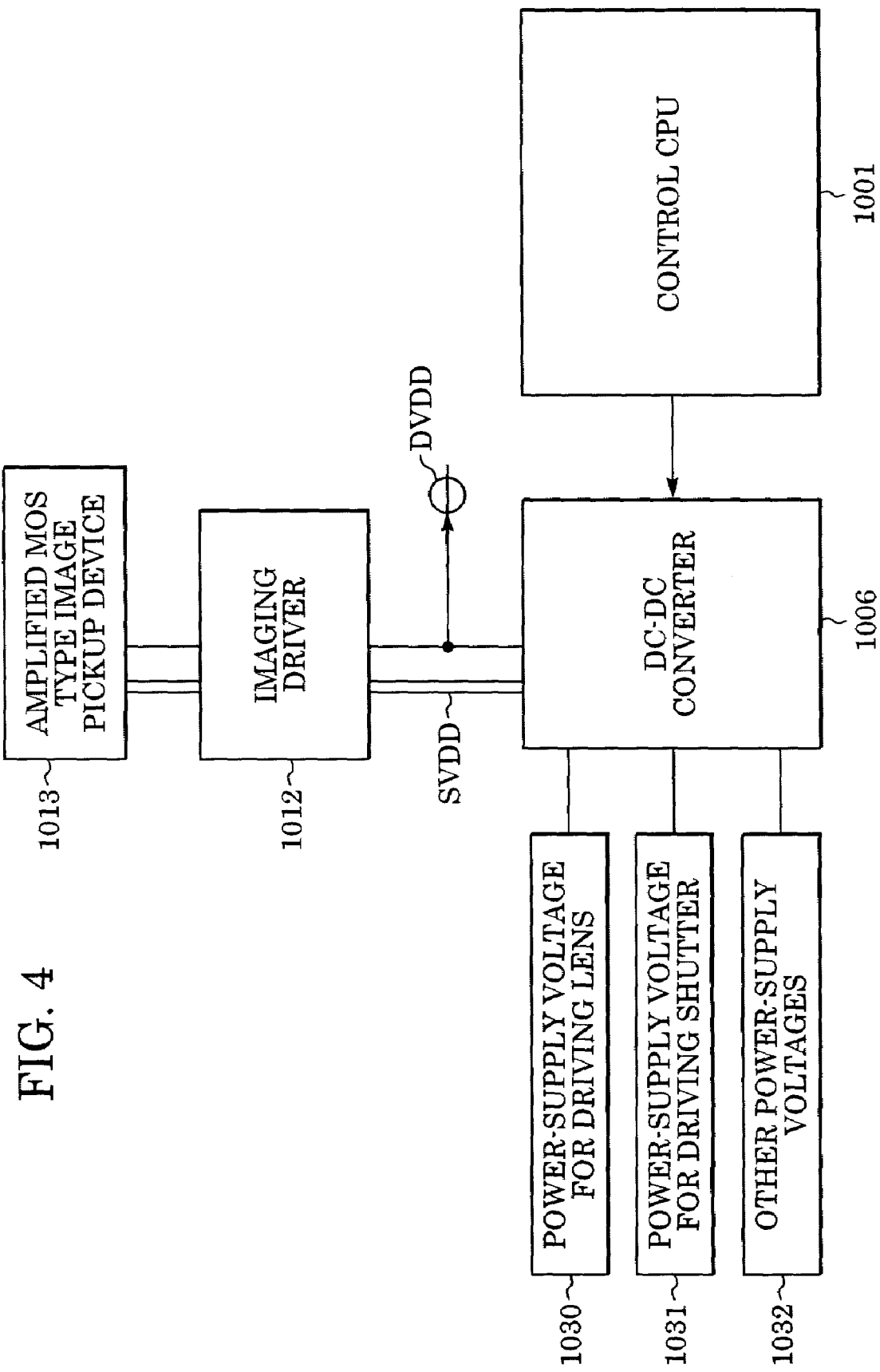
FIG. 4 is a block diagram showing an example of the structure of the power supply of the digital camera according to the first embodiment of the present invention.

FIG. 4 is a block diagram showing an example of the structure of the power supply of the digital camera according to the first embodiment. Power voltages applied to the imaging driver 1012 and the amplified MOS type image pickup device 1013 will now be described with reference to FIG. 4.

The DC-DC converter 1006 generates voltages necessary for image capturing in accordance with instructions supplied from the control CPU 1001. A voltage of 5V from the power supply DVDD and a voltage of 4.1V or 5V from the power supply SVDD are applied to the imaging driver 1012. The 5V voltage from the power supply DVDD can also be used in circuits other than the imaging driver 1012 and, therefore, it branches off. The voltage supplied from the power supply SVDD to the imaging driver 1012 is set to 4.1V or 5V depending on the image capturing conditions. The DC-DC converter 1006 also outputs a power-supply voltage 1030 for driving the lens, a power-supply voltage 1031 for driving the shutter, and other power-supply voltages 1032 necessary for the operation of the digital camera, in addition to voltages from the power supply DVDD and the power supply SVDD.

A flow of capturing an image, when the digital camera according to the first embodiment is used, will now be described.

According to the first embodiment, when the user sets a low sensitivity less than ISO 200, the power supply SVDD is set to 5V. In contrast, when the user sets a high sensitivity greater than or equal to ISO 200, the power supply SVDD is set to 4.1V.

The user sets the ISO sensitivity with the ISO-sensitivity setting switch 1003 before capturing an image. The control CPU 1001 supplies a signal to the DC-DC converter 1006 in accordance with the setting by user.

First, a case in which the user sets a low sensitivity will be described. When the ISO sensitivity is set to ISO 100, the control CPU 1001 stores the sensitivity for image capturing. After the release switch 1002 is pressed, the image capturing is immediately started. The control CPU 1001 activates the lens driving circuit 1008 to move the lens 1009 to a position where an object is imaged on the amplified MOS type image pickup device 1013.

Concurrently with the movement, the control CPU 1001 instructs the DC-DC converter 1006 to output the 5V voltage from power supply SVDD. The DC-DC converter 1006 supplies the 5V voltage from power supply DVDD and the 5V voltage from the power supply SVDD to the amplified MOS type image pickup device 1013 through the imaging driver 1012 for image capturing. Concurrently with the supply of the voltages, the metering circuit 1005 starts photometric measurement. The control CPU 1001, which receives the data yielded by the photometric measurement, calculates a released time of the shutter 1010 and drives the shutter driving circuit 1007 based on the calculated releases time to open the shutter 1010.

The amplified MOS type image pickup device 1013 performs exposure operation after the shutter 1010 is opened before the shutter 1010 is closed. The exposure operation, output of a pixel signal, and so on, are performed based on the timing signals supplied from the timing generator 1011 under the control of the control CPU 1001.

Figure 5:
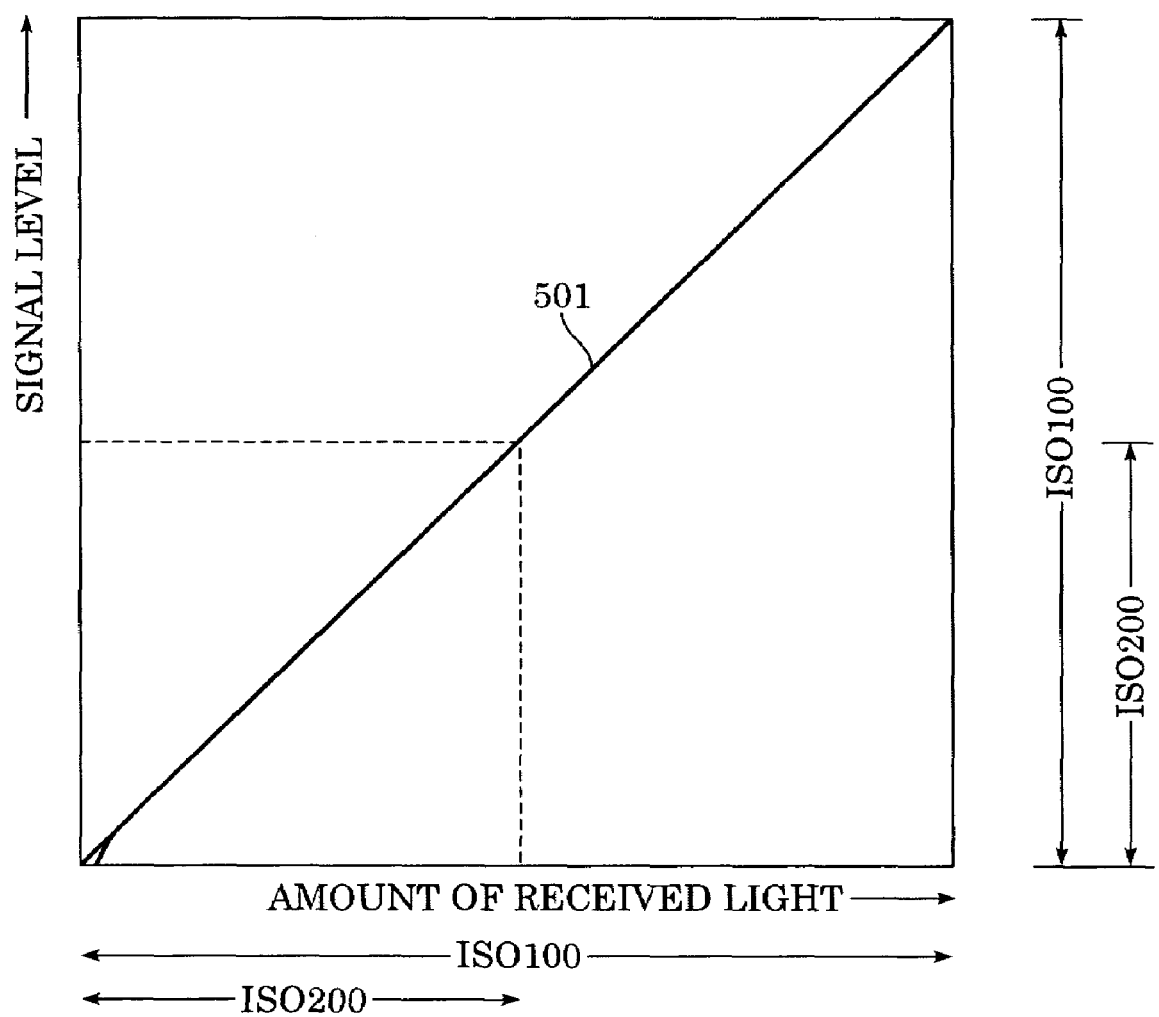
FIG. 5 is a log-log graph showing a photoelectric conversion characteristic of the amplified MOS type image pickup device at a low sensitivity according to the first embodiment of the present invention.

After the exposure operation, the amplified MOS type image pickup device 1013 outputs an analog image signal. FIG. 5 is a log-log graph showing the relationship (photoelectric conversion characteristic) between the amount of light received by the amplified MOS type image pickup device 1013 at the low sensitivity and the level of an image signal output from the amplified MOS type image pickup device 1013. As shown by a photoelectric conversion characteristic 501 in FIG. 5, the amplified MOS type image pickup device 1013 exhibits an excellent linearity in the entire graph.

The analog image signal output from the amplified MOS type image pickup device 1013 is supplied to the imaging signal processing circuit 1014. After, for example, the clamping is performed, the analog image signal is supplied to the A/D converter 1015 to be converted into a digital image signal. The digital image signal is subjected to a variety of correction and/or compression in the signal processor 1016 and is temporarily stored in the memory unit 1017. The digital image signal, which is temporarily stored in the memory unit 1017 in the above manner, is written in the removable recording medium 1019 through the recording-medium control interface unit 1018 or is displayed on the monitoring device 1020, depending on the purpose of the user. The user, for example, confirms the captured image in this manner.

Next, a case in which the user sets a high sensitivity will be described. When the ISO sensitivity is set to a high sensitivity such as ISO 3200, the control CPU 1001 stores the sensitivity for image capturing. The subsequent flow is the same as in the case in which the ISO sensitivity is set to ISO 100. However, the power supply SVDD is not set to 5V but to 4.1V.

Figure 6:
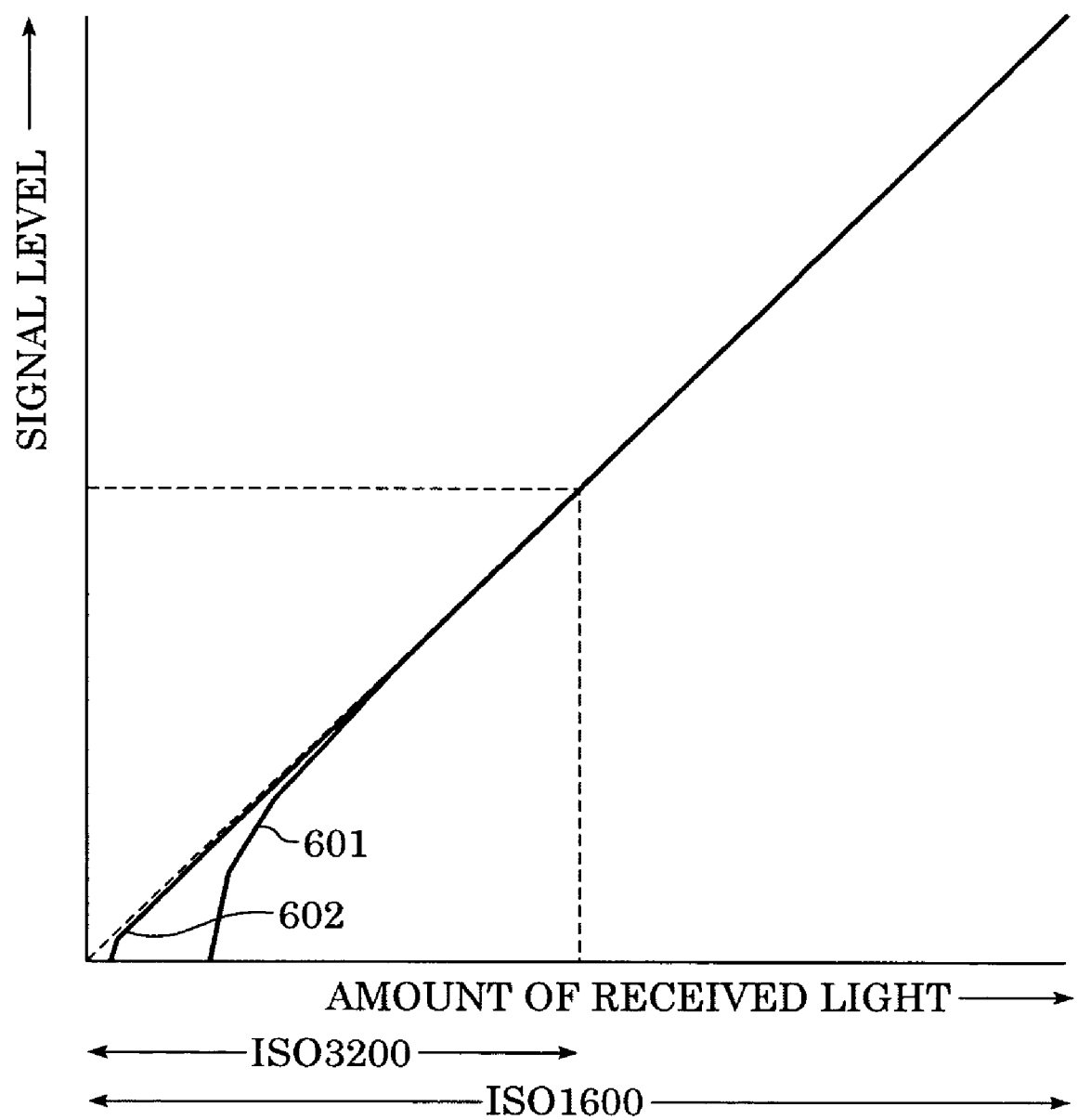
FIG. 6 is a log-log graph showing photoelectric conversion characteristics of the amplified MOS type image pickup device at a high sensitivity according to the first embodiment of the present invention.

FIG. 6 is a log-log graph showing the relationship (photoelectric conversion characteristics) between the amount of light received by the amplified MOS type image pickup device 1013 at the high sensitivity and the levels of image signals output from the amplified MOS type image pickup device 1013.

As shown in FIG. 6, in photoelectric conversion characteristic 601 with the power supply SVDD being set to 5V, the signal level is reduced when the amount of received light is small and, therefore, the linearity is not maintained. In contrast, in photoelectric conversion characteristic 602 with the power supply SVDD being set to 4.1V, the linearity is almost maintained in the entire graph.

Although the linearity is slightly reduced, in FIG. 6, in an area where the amount of received light is very small even in the photoelectric conversion characteristic 602, in which the power supply SVDD is set to 4.1V, this reduction is within tolerance of the measurement. The inventor has verified that the digital camera exhibits extremely good linearity and that no black crashing occurs in the captured image, when the power supply SVDD is set to 4.1V.

As described above, according to the first embodiment, the voltage from the power supply SVDD for the reset MOS transistor 102 and the source follower amplifier 104 is varied in accordance with the ISO sensitivity while increasing the area of the photodiode 101 as much as possible to achieve a sufficient amount of received light even at the low sensitivity. With this structure, it is possible to substantially maintain the linearity of the relationship between the amount of light received by the amplified MOS type image pickup device 1013 and the level of the output signal without largely changing the structure of the amplified MOS type image pickup device shown in FIG. 10. Accordingly, the good image quality can be realized regardless of the set sensitivity without a complicated structure.

Second Embodiment

A second embodiment of the present invention will be described below. According to the second embodiment, a circuit for switching the voltage from the power supply SVDD is provided in the amplified MOS type image pickup device. Accordingly, the second embodiment differs from the first embodiment described above in the structure for switching the voltage from the power supply SVDD. The same reference numerals are used in the following description to identify the same elements as in the first embodiment shown in FIGS. 1 to 6. A detailed description of such elements is therefore omitted herein.

Figure 7:
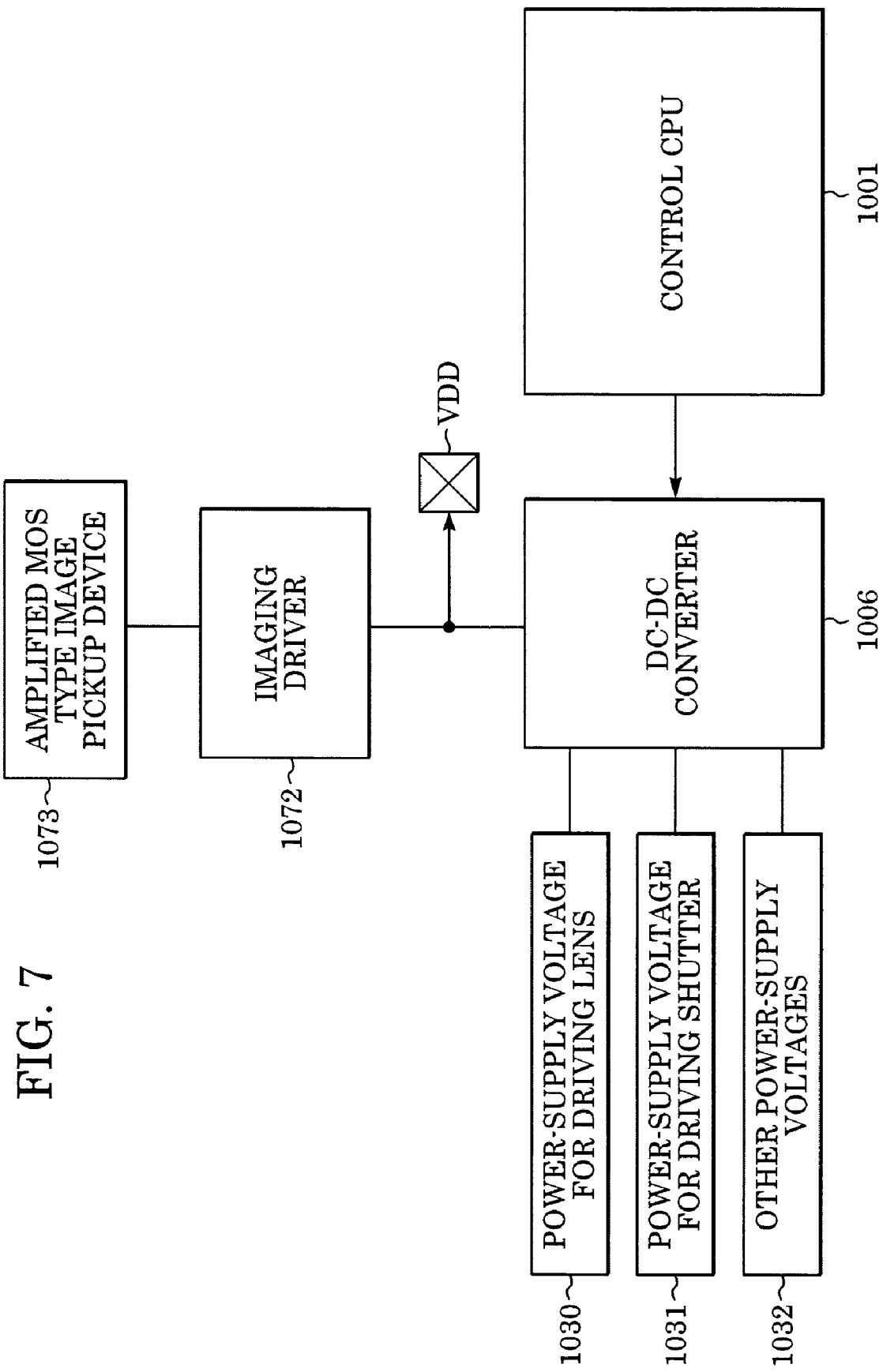
FIG. 7 is a block diagram showing an example of the structure of the power supply of a digital camera according to a second embodiment of the present invention.
Figure 8:
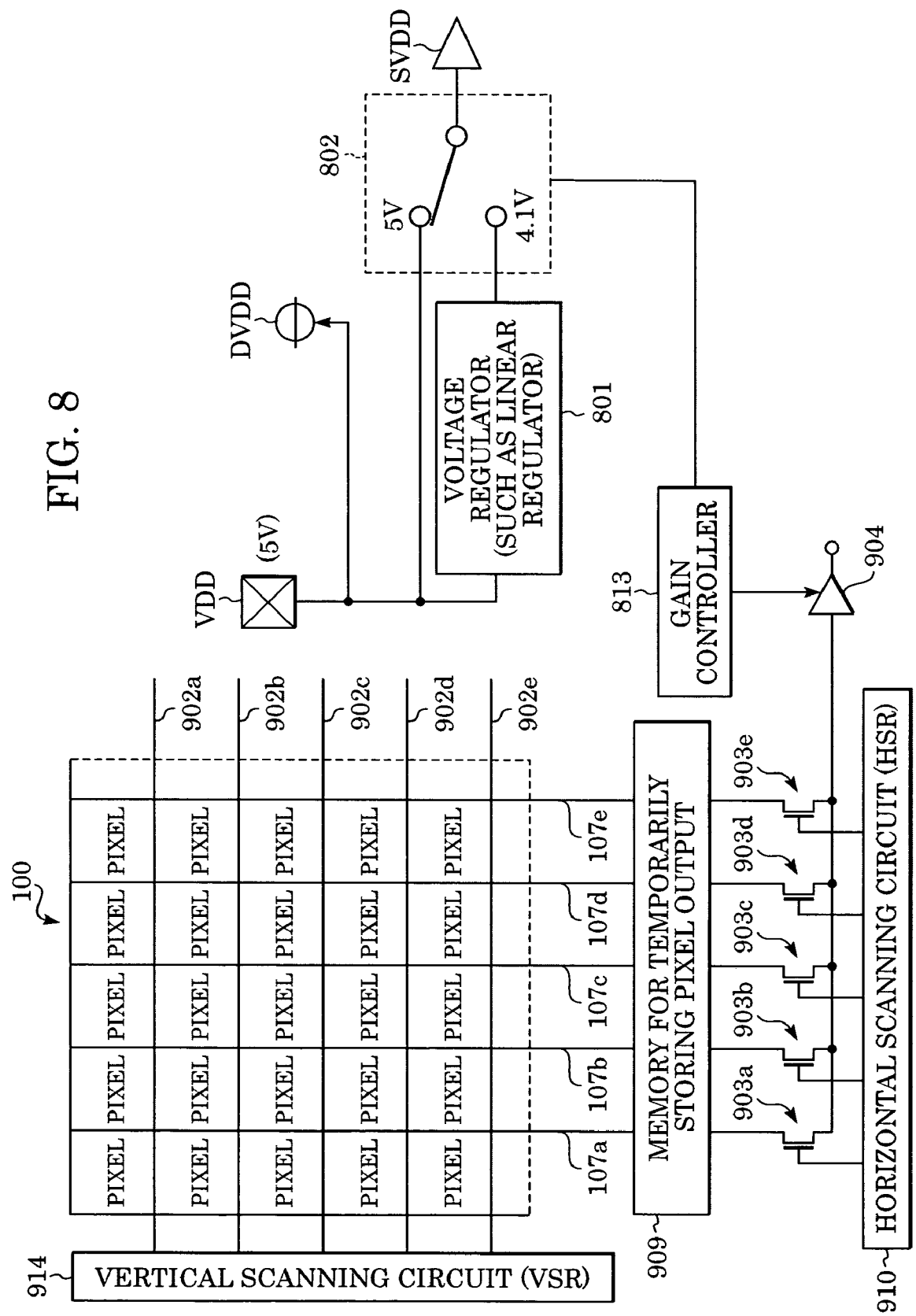
FIG. 8 shows an example of the schematic structure of an amplified MOS type image pickup device and the readout circuit of the amplified MOS type image pickup device according to the second embodiment of the present invention.
Figure 9:
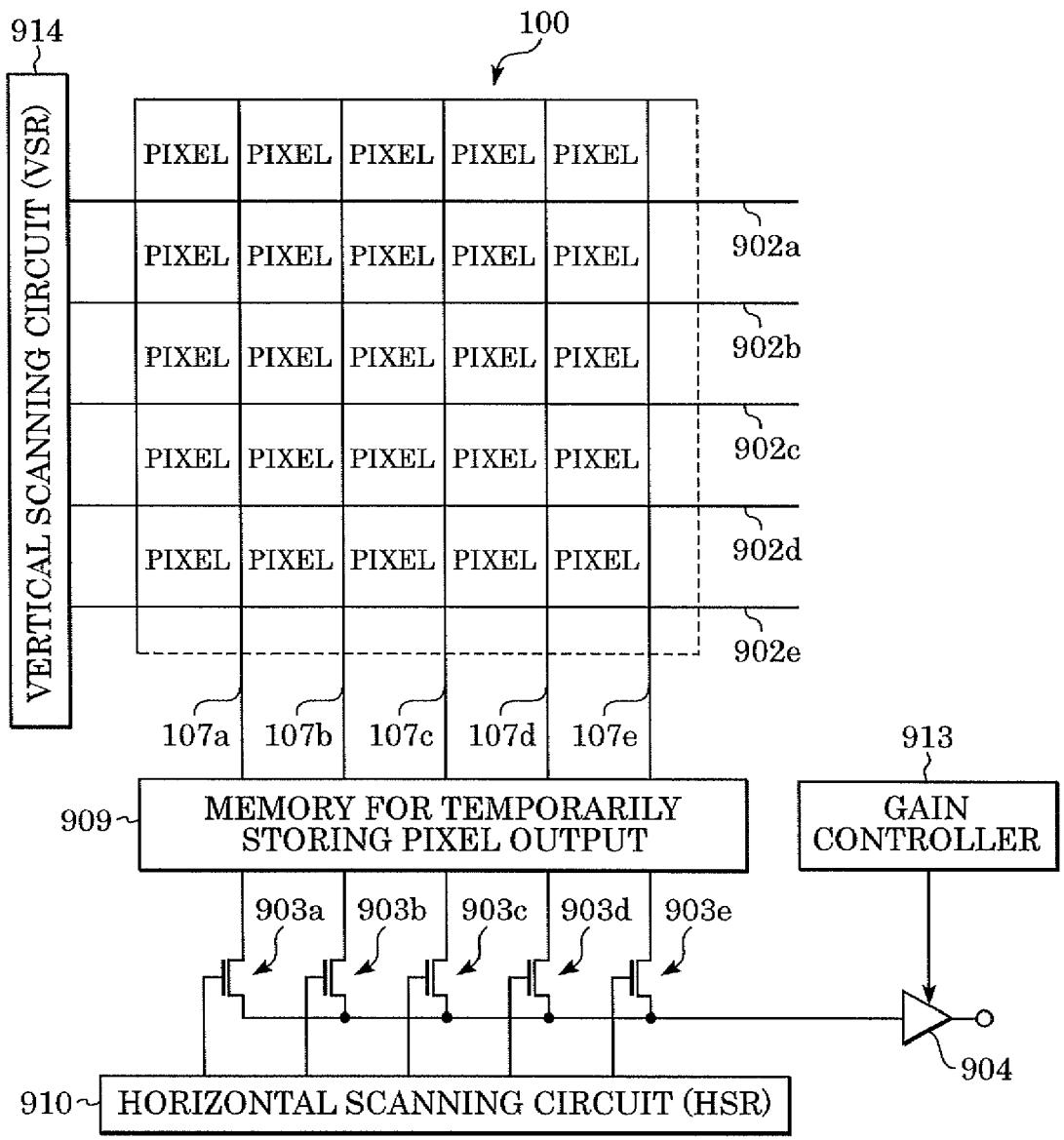
FIG. 9 shows a schematic structure of an amplified MOS type image pickup device and the readout circuit of the amplified MOS type image pickup device in a related art.

FIG. 8 shows an example of the schematic structure of an amplified MOS type image pickup device 1073 (FIG. 7) and the readout circuit of the amplified MOS type image pickup device 1073 according to the second embodiment.

Referring to FIG. 8, the structure includes a voltage regulator 801, a voltage switch 802, and a gain controller 813. The voltage regulator 801, for example, a linear regulator, changes the input voltage from the power supply VDD to 4.1V. The voltage switch 802, which is realized by a switching element, selects either the voltage from the power supply VDD or the voltage changed by the voltage regulator 801.

The power supply VDD for the amplified MOS type image pickup device 1073 according to the second embodiment is set to 5V. The 5V voltage from the power supply VDD is supplied to the power supply DVDD, which is the main power supply in the amplified MOS type image pickup device 1073. In contrast, either the 5V voltage output from the power supply VDD or the 4.1V voltage decreased by the voltage regulator 801 is supplied to the power supply SVDD through the switching operation by the voltage switch 802.

According to the second embodiment, the gain of an output amplifier 904 is switched in the gain controller 813 in accordance with the ISO sensitivity. The voltage from the power supply SVDD is switched in accordance with the switching in the gain controller 813. A manner in which the power supply SVDD is switched in accordance with the ISO sensitivity is determined for every image pickup device. Accordingly, the voltage regulator 801, the voltage switch 802, and the gain controller 813 may be built in the amplified MOS type image pickup device 1073 in the manufacturing process. The voltage regulator 801, the voltage switch 802, and the gain controller 813 may be built in an imaging driver 1072.

FIG. 7 is a block diagram showing an example of the structure of the power supply of the digital camera according to the second embodiment.

As shown in FIG. 7, only the voltage output from the power supply VDD is supplied from the DC-DC converter 1006 to the imaging driver 1072. Unlike the first embodiment described above, the voltage supplied from the DC-DC converter 1006 to the imaging driver 1072 is not switched in accordance with the set ISO sensitivity.

As described above, according to the second embodiment, the 5V voltage from the power supply VDD is changed to 4.1V by the voltage regulator 801. The changed voltage is supplied to the imaging driver 1072 and the amplified MOS type image pickup device 1073 at the high sensitivity, whereas the 5V voltage output from the power supply VDD is supplied to the imaging driver 1072 and the amplified MOS type image pickup device 1073 at the low sensitivity. This structure brings the advantage of easy substitution of a known digital camera, in addition to the advantages of the first embodiment, because there is no need to considerably change the structure of the known digital camera.

The case in which the ISO sensitivity is roughly divided into the two groups, the two voltages corresponding to the two divided ISO sensitivities are output from the power supply SVDD, and the two voltages from the power supply SVDD are switched in accordance with the ISO sensitivity is exemplified in the above embodiments. However, it is necessary to switch the voltage from the power supply SVDD for every ISO sensitivity, depending on the manufacturing method of the semiconductor. That is, the number of voltages switched in accordance with the ISO sensitivity is not limited to two. The voltages from the power supply SVDD may be switched in a stepless manner in accordance with the set ISO sensitivity.

As described above, according to the above embodiments, switching the voltages for resetting the FD region can extend the dynamic range (the range of signals input in the source follower amplifier 104) according to the gain of the source follower amplifier 104 and can maintain the linearity of the relationship between the amount of light received by the amplified MOS type image pickup device and the output signal level, even in a known amplified MOS sensor.

Other Embodiments

Various devices that are operated in accordance with the program code, for realizing the functions of the embodiments described above, stored in the computer (CPU or microprocessor unit (MPU)) in an apparatus or a system connected to the devices are within the scope of the present invention.

In this case, the program code itself realizes the functions according to the above embodiments. The program code itself and means for supplying the program code to the computer, for example, a recording medium storing the program code, constitute the present invention. The recording media storing the program code include a floppy disk, a hard disk, an optical disc, a magneto-optical disk, a compact disc read only memory (CD-ROM), a magnetic tape, a nonvolatile memory card, and a read only memory (ROM).

The computer that executes the supplied program code realizes the functions of the embodiments described above. In addition, the present invention is embodied by the program code that realizes the functions of the embodiments described above in cooperation with the operating system (OS) or other applications running on the computer.

Alternatively, after the program code has been stored in a memory that is provided in a function expansion board included in the computer or in a function expansion unit connected to the computer, the CPU or the like in the function expansion board or the function expansion unit may execute all or part of the actual processing based on the instructions in the program code to realize the functions of the embodiments described above.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-122079 filed Apr. 16, 2004, which is hereby incorporated by reference herein.

What is claimed is:

1. An imaging system comprising:
a plurality of pixels, each including:
a photoelectric transducer converting an optical signal into signal charge;
a charge transfer device transferring the signal charge converted by the photoelectric transducer;
an amplifying device amplifying the signal charge transferred from the photoelectric transducer by the charge transfer device and outputting the amplified signal charge to an output line; and
a reset switch used for resetting the voltage of an input terminal of the amplifying device; and
a control circuit for switching a reset voltage supplied through the reset switch in accordance with a sensitivity set in the imaging system,
wherein the control circuit sets a first reset voltage when the set sensitivity is higher than or equal to a predetermined value and sets a second reset voltage, which is higher than the first reset voltage, when the set sensitivity is lower than the predetermined value.

\* \* \* \* \*